United States Patent
Perälä

[19]

[11] Patent Number: 5,828,750
[45] Date of Patent: Oct. 27, 1998

[54] POSITIVE HOLDING RACK

[75] Inventor: Risto Perälä, Salo, Finland

[73] Assignee: Nokia Mobile Phones Ltd., Salo, Finland

[21] Appl. No.: 658,443

[22] Filed: Jun. 10, 1996

[30]       Foreign Application Priority Data

Jun. 30, 1995   [FI]   Finland ..................................... 953250

[51] Int. Cl.⁶ .................................................. H04M 1/00
[52] U.S. Cl. ............................................ 379/446; 379/455
[58] Field of Search .................................. 379/428, 446, 379/447, 426, 454, 455; 455/89, 90

[56]                References Cited

U.S. PATENT DOCUMENTS

| | | | |
|---|---|---|---|
| 4,406,928 | 9/1983 | MacKenzie | 179/146 R |
| 4,741,034 | 4/1988 | Errichiello et al. | 379/455 |
| 4,957,264 | 9/1990 | Hakanen | 248/510 |
| 5,016,851 | 5/1991 | Koskinen et al. | 248/278 |
| 5,040,712 | 8/1991 | Pesonen et al. | 224/42.45 |
| 5,113,436 | 5/1992 | Jarvela et al. | 379/455 |
| 5,121,863 | 6/1992 | Kotitalo et al. | 224/42.45 |
| 5,157,722 | 10/1992 | Hollowed et al. | 379/428 |
| 5,189,698 | 2/1993 | Hakanen | 379/455 |
| 5,282,246 | 1/1994 | Yang | 379/455 |

FOREIGN PATENT DOCUMENTS

| | | |
|---|---|---|
| 2 694 672 | 2/1994 | France . |
| 4015091 A1 | 1/1991 | Germany . |
| 4008618 A1 | 9/1991 | Germany . |
| 43 10 600 C 1 | 7/1994 | Germany . |
| 94 09 902.2 | 10/1994 | Germany . |
| 44 05 506 A1 | 8/1995 | Germany . |
| 5091173 | 4/1993 | Japan ..................................... 379/428 |
| 686 269 A5 | 2/1996 | Switzerland . |
| 2 260 160 | 4/1993 | United Kingdom . |

OTHER PUBLICATIONS

Patent Abstracts of Japan, vol. 017, No. 575 (E–1449), 20 Oct. 1993 & JP–A–05 167657 (Matsushita Electric Ind Co Ltd), 2 Jul. 1993.

Patent Abstracts of Japan, vol. 017, No. 444 (E–1415), 16 Aug. 1993 & JP–A–05 095394 (Matsushita Electric Ind Co Ltd.), 16 Apr. 1993.

*Primary Examiner*—Jack Chiang
*Attorney, Agent, or Firm*—Perman & Green, LLP

[57]                ABSTRACT

The invention relates to a rack for an electronic handset, such as a mobile phone. The rack has at opposite ends three locking points (6,11) by which the handset is attached to the rack. At least one point (11) has a spring-loaded locking latch. The rack can be used e.g. to attach a phone to the dashboard of a car. In the rack, the handset stays securely in its place also in motion.

6 Claims, 4 Drawing Sheets

POSITIVE HOLDING RACK

TECHNICAL FIELD

The invention relates to electronic devices, such as mobile phones, and pertains to a rack having attachment means to hold a device in its place in the rack. The invention can be used e.g. to attach a phone to the dashboard of a car.

BACKGROUND OF THE INVENTION

Together with a mobile phone it is often used a rack into which the phone can be placed. The rack can be attached e.g. to the dashboard of a car. Usually the device also includes some kind of locking means to hold the phone in its place also in motion.

To enable attachment of different phones in one and the same rack, the phones have to be of the same shape, which limits the number of designs. Alternatively, there has to be a rack for each different model, which increases costs.

It is known, e.g. from FI-patent 89650 (Nokia Matkapuhelimet Oy), a mobile phone rack having different models for phones with different shapes. The rack includes attachment means that press the phone from the sides.

DESCRIPTION OF THE INVENTION

General Description

Now it has been invented a rack according to claim 1. The preferred embodiments of the invention are presented in the other claims.

The rack according to the invention has one locking point at one end and two locking points at the other end to attach a handset to the rack. At least one locking point has a spring-loaded latch to lock the handset into the rack. The best way to attach the handset is to lock it so that it can be removed from the rack only when the locking is released.

The invention is also directed to a locking system. It includes locking elements, such as hooks or the like, which can move in the rack and clutch the handset and forcelock the handset securely into the rack.

Handsets of various shapes can be inserted in the rack as long as they have counterparts that meet the support points. Manufacturing of racks becomes cheaper and simpler when one and the same rack can serve different handsets. Yet the rack is simple, reliable and easy to use.

DRAWINGS

The accompanying drawings are part of the detailed description of the invention. In the drawings FIG. 1 is a side view of the rack and a phone inserted in it, FIG. 2 shows the rack and a phone inserted in it as seen from the top end at an angle, FIG. 3 shows the rack and a phone inserted in it as seen from the bottom end at an angle, and FIG. 4 is an exploded view of the rack.

DETAILED DESCRIPTION

Figure 1:
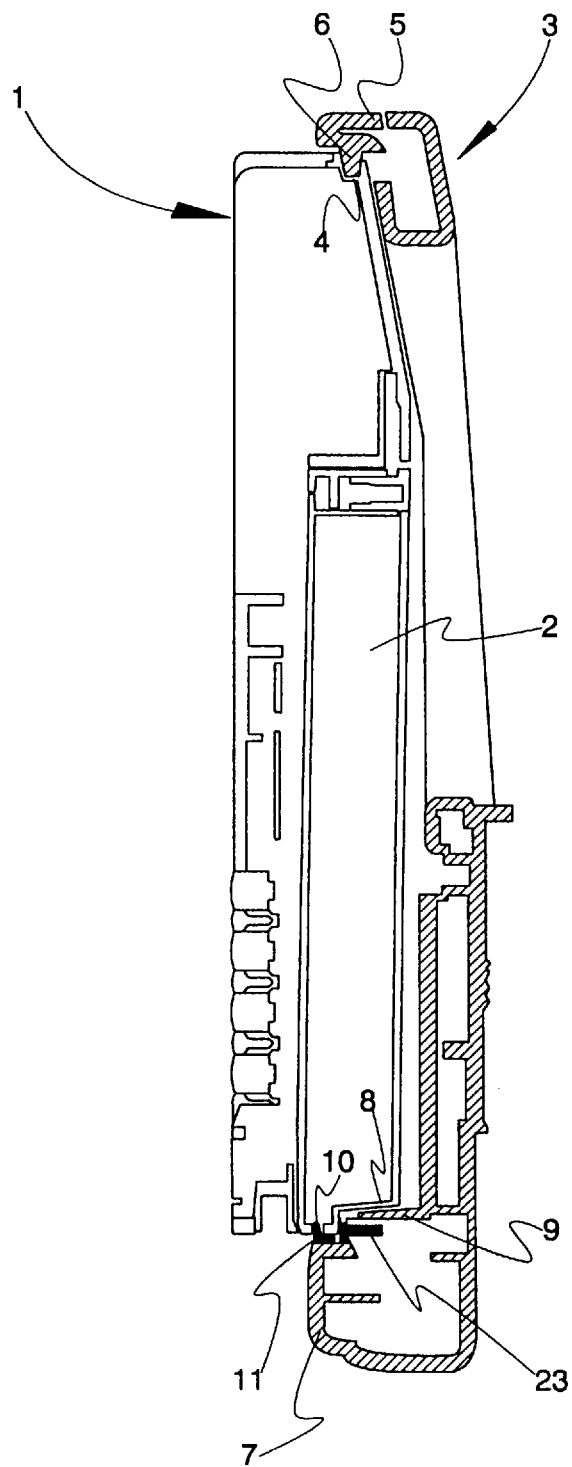
Figure 2:
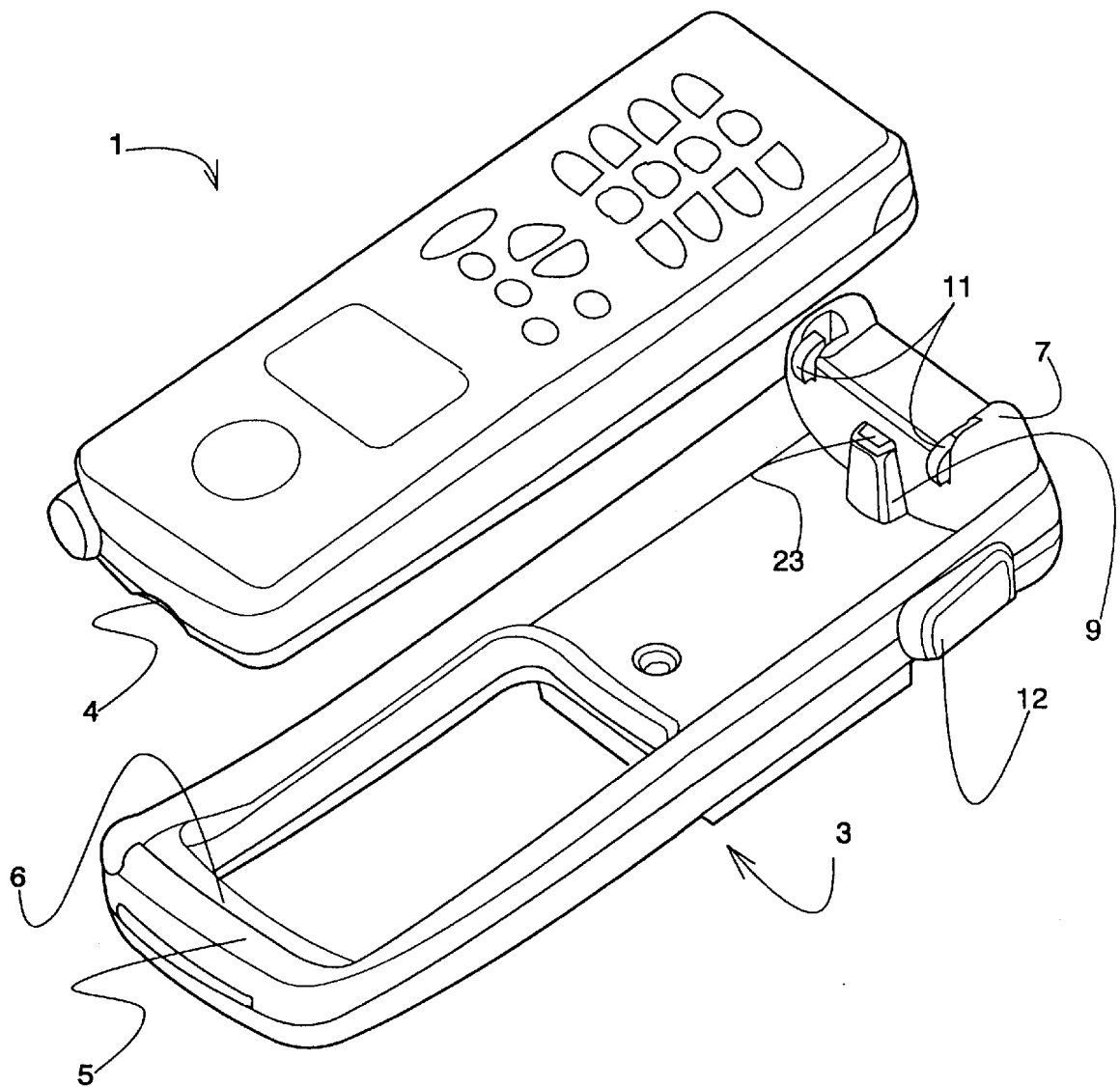
Figure 3:
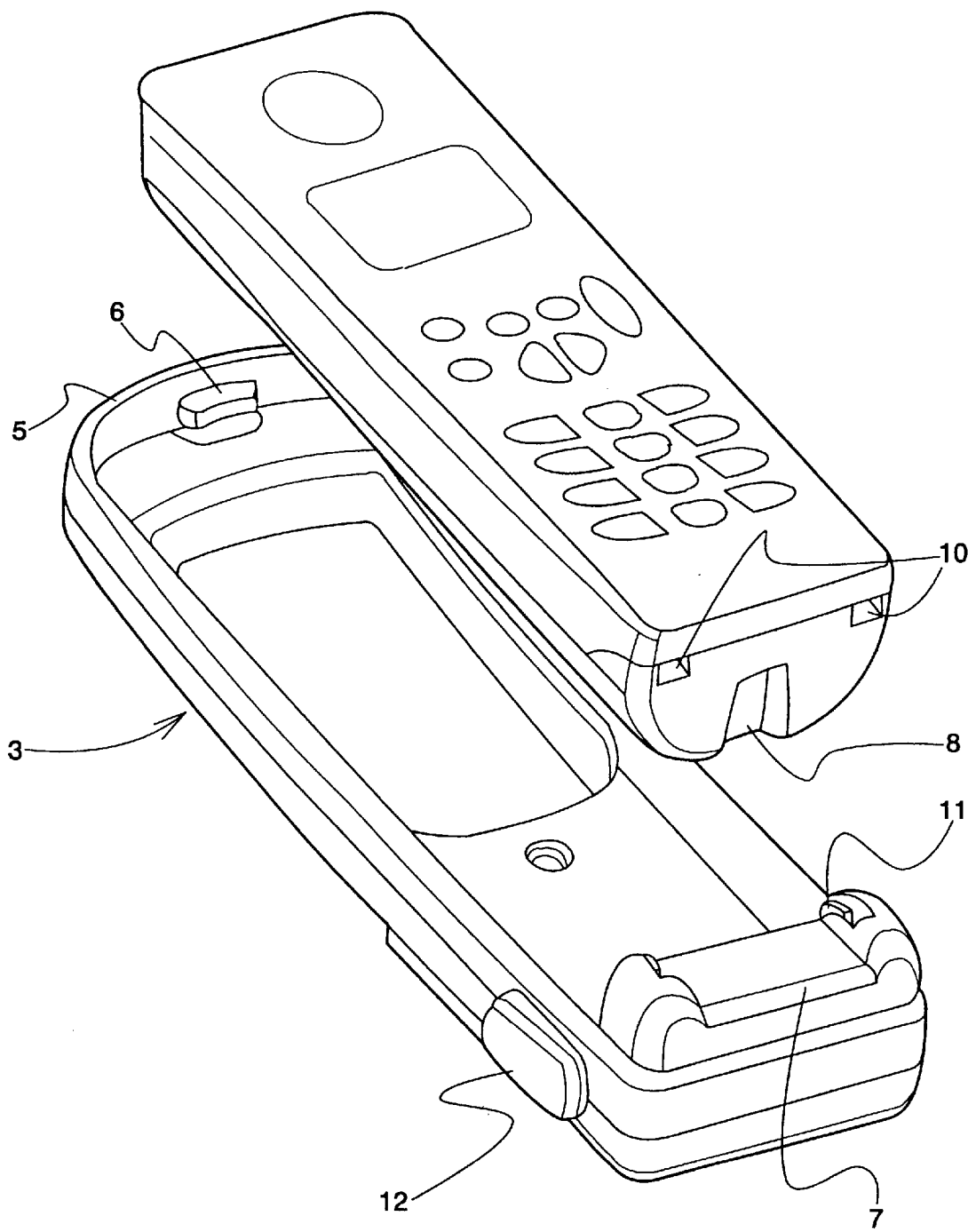
Figure 4:
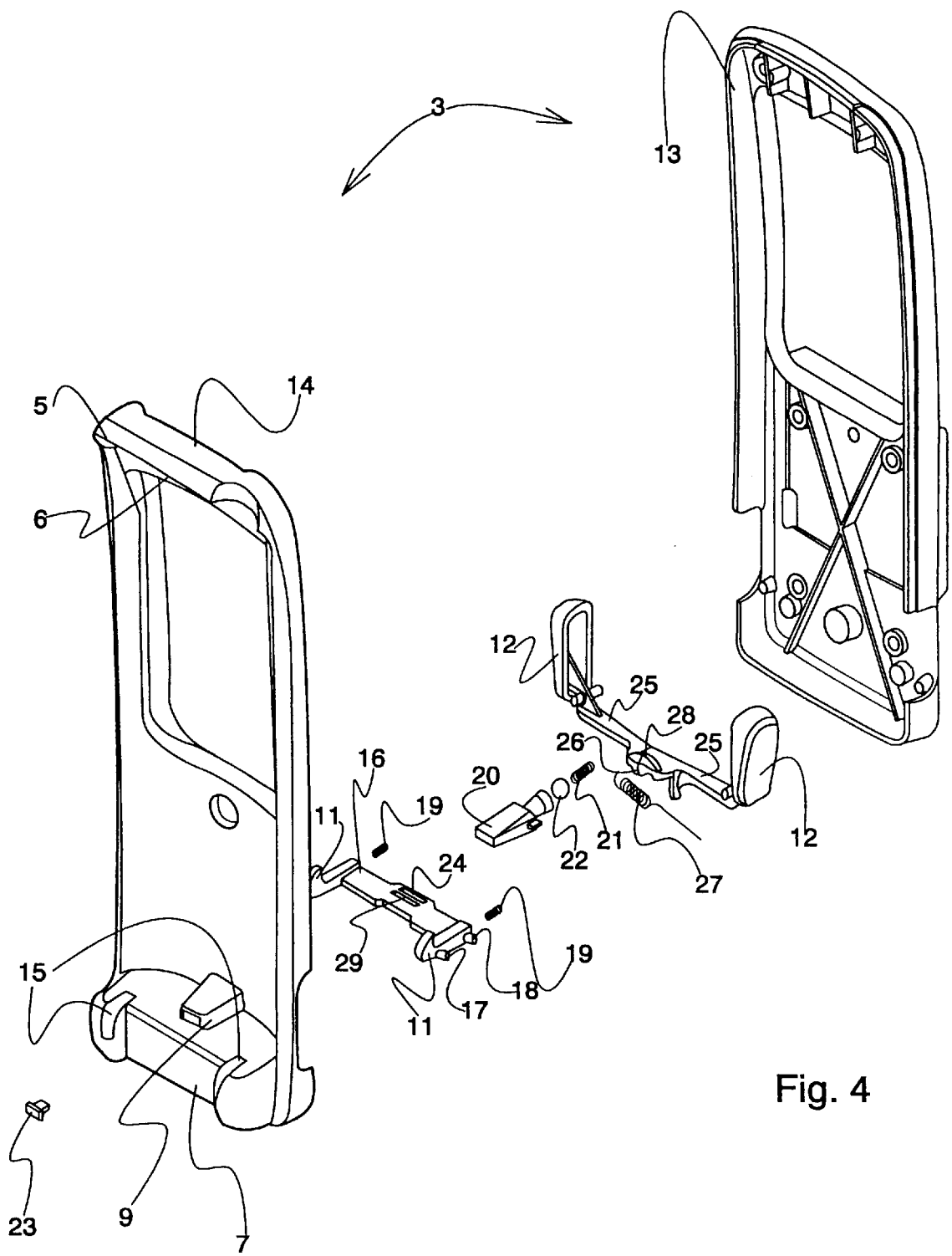

The phone 1 according to FIG. 1 has a body part and a battery 2 on its rear side. The phone is attached to a rack 3 the rear side against the front side of the rack. The rack can be attached by its rear side to the dashboard of a car, for example.

At the top end of the phone 1 there is an upper cavity 4. At the top end of the rack 3 there is a forward projection 5 and on its lower surface an upper nose 6 the shape of which corresponds to the cavity, so that the nose is placed in the cavity when the phone is in its place in the rack. In the application illustrated, the cavity is a transversal conical groove and the nose a ridge corresponding to it. At the lower end of the rack there is a protruding support 7 against which the lower end of the phone is placed.

At the lower end of the phone there is a guide groove 8 perpendicular to the rack 3 which becomes slightly wider towards the edge of the phone. At the lower end of the rack there is a guide nose 9 of the corresponding shape, so that the guide nose is placed in the guide groove when the phone is inserted in its place in the rack. The front end of the guide nose is open and in it there operates a push element described below.

At the lower end of the phone there is also on both sides of the guide groove 8 a locking cavity 10 extending into the phone in the vertical direction. At the lower end of the rack there are spring-loaded locking hooks 11 which meet the locking cavities and press the phone in the rack clearance-free against the upper nose 6 and guide nose 9 of the rack 3. On the sides of the rack there are release buttons 12 which release the locking hooks from the locking cavities of the phone when pressed.

The rack 3 has a rear cover 13 and a front cover 14. In the upper part of the rack there is an opening. The covers are fastened to each other with screws. The locking mechanism is inside the lower part of the rack.

In the upper front corners on both sides of the support 7 at the lower end of the rack there are holes 15 through which the locking hooks 11 rise to the locking cavities 10 at the lower end of the phone 1. The locking hooks protrude upwards from a slide 16. On both sides of the slide there are a front pin 17 and a rear pin 18 pointing to the side. On the inner side surfaces of the support there are grooves in which these pins slide. A groove has a horizontal part and in the front end of that part there is a lower branch which runs obliquely downward. The slide is pushed forward by two springs 19. When the slide is in its front position, the front pin is at the lower end of the lower branch and the locking hooks are inside the support. When the front pin is in the horizontal part of the groove, the hooks are outside the upper surface of the support and cannot be pressed down at that position.

On top of the slide 16 there is a push element 20. It is pressed forward by a spring 21 with an O-ring 22 between them. The push element is the shape of the guide nose 9 and the front end of the push element comes through the hole in the front edge of the nose. At the front end of the push element there is an elastic cover 23. On the lower surface of the push element there is a claw, and on the upper surface of the slide there is a projection 24 which meets that claw. When the push element is in its front position, the claw is located in front of the projection. When the push element is pressed, the claw catches the projection and forces the slide to follow the push element.

The release buttons 12 have shanks 25 pointing inward and to each other, and the ends of the shanks meet each other forming a hinge 26. The ends are shaped such that when either of the release buttons is pressed, both shanks move downward. The shanks are pulled to each other and to their horizontal position by a spring 27. The ends of the shanks form a transversal latch claw 28 protruding upward. It is met by the latch groove 29 in the slide.

A phone 1 is inserted in the rack 3 as follows: first, the upper cavity 4 of the phone is pushed onto the upper nose 6 of the rack and then the lower end of the phone is pressed against the rack. Then the guide groove 8 at the lower end of the phone hits the push element 20 which starts to move backward. The claw of the push element catches the slide 16 which follows the push element, whereby the locking hooks 11 are lifted into the locking cavities of the phone. When the push element and slide reach their rear position the latch groove 29 of the slide meets the latch claw 28 thus locking the phone securely into its place. The phone is pressed, clearance-free, against the locking hooks and upper nose. The phone will not come off accidentally e.g. in a collision, unless the collision is so strong that the device gets broken.

When the user wishes to remove the phone 1 from the rack 3, he presses the release buttons 12, whereby the elements of the latch claw 28 move downward together with the shanks 25 thus releasing the slide 16. Then the slide and push element 20 are free to move forward and the locking hooks 11 come off the phone and are lowered inside the support 7.

The locking system disclosed is simple, reliable and easy to use. The phone is held in its place in the rack independent of the position of the rack.

I claim:

1. In combination with an electronic handset, a rack for locking said handset against movement thereon, said handset having an upper end and a lower end and the rack having frame defining a space with an upper end and a lower end, and the handset is inserted in the space;

said rack having at one end a point of attachment and at the opposite end two points of attachment which are attached to counterparts at corresponding locations in the handset when inserted in the rack thus holding the handset in the rack;

said two points of attachment being defined by a latch comprised of two spaced apart locking hooks protruding from opposite sides of a transverse slide member, said transverse slide member further having at least one pin extending from each side edge thereof, each of said pins being sized and shaped to be received within a corresponding groove in the frame and said transverse slide member being biased in the direction of said locking hooks by at least one first spring;

a push element biased in the direction of the transverse slide member by a second spring, and said frame having an opening therein for allowing a portion of said push element to protrude therethrough;

said push element having a surface engageable with a corresponding surface on said transverse slide member when said push element is moved in a direction oppositely of the bias of said second spring; and release buttons carried by said frame having shanks which cooperate with a latch claw engagable with said slide member to effect selective locking or unlocking of the transverse slide member.

2. The combination as defined in claim 1 further characterized by said frame having a front face which are formed a pair of openings disposed adjacent said opposite end, said locking hooks protrude through the openings.

3. The combination as defined in claim 2 further characterized by each of the grooves in said frame has a front end corresponding with the front face of said frame and wherein each said groove has a horizontal part and a lower branch part which runs obliquely from said horizontal part of said groove.

4. The combination as defined in claim 3 further characterized by said push element includes a claw.

5. The combination as defined in claim 4 further characterized by said corresponding surface on said transverse slide member having a projection engageable with said claw.

6. The combination as defined in claim 5 further characterized by said transverse slide member includes a latch groove locking with said latch claw.

* * * * *